(12) United States Patent
Bachelder

(10) Patent No.: US 6,895,952 B1
(45) Date of Patent: May 24, 2005

(54) APPLIANCE END FITTING

(75) Inventor: Patrick E. Bachelder, Battle Creek, MI (US)

(73) Assignee: Marshall Excelsior Company, Marshall, MI (US)

( * ) Notice: Subject to any disclaimer, the term of this patent is extended or adjusted under 35 U.S.C. 154(b) by 0 days.

(21) Appl. No.: 10/701,949

(22) Filed: Nov. 5, 2003

(51) Int. Cl.⁷ .............................................. F16K 13/08
(52) U.S. Cl. ..................... 126/25 R; 137/74; 137/75; 137/76; 251/149.6; 285/2; 285/3; 431/21; 431/22
(58) Field of Search ..................... 126/25 R; 137/72, 137/74, 75, 76, 77; 251/149.6; 285/2, 3, 285/4, 187; 431/21, 22

(56) References Cited

U.S. PATENT DOCUMENTS

| | | | |
|---|---|---|---|
| 2,842,381 A | 7/1958 | Franck | |
| 3,245,426 A | 4/1966 | Kreuter et al. | |
| 3,532,101 A | 10/1970 | Snyder | |
| 4,070,003 A | 1/1978 | Shames et al. | |
| 4,088,436 A | 5/1978 | Alferes | |
| 4,280,523 A | 7/1981 | Norton | |
| 4,290,440 A | 9/1981 | Sturgis | |
| 4,825,893 A | 5/1989 | Gailey | |
| 4,874,012 A | 10/1989 | Velie | |
| 4,911,194 A | 3/1990 | Lechner | |
| 5,027,845 A | 7/1991 | Silagy | |
| 5,330,155 A | 7/1994 | Lechner | |
| 5,842,500 A | 12/1998 | Rockwood et al. | |
| 5,979,867 A | 11/1999 | Ortiz Godinez | |

Primary Examiner—Jiping Lu
(74) Attorney, Agent, or Firm—Varnum Riddering Schmidt Howlett, LLP

(57) ABSTRACT

An appliance end fitting for connecting a gas operated appliance to a pressurized gas cylinder includes a simplified interior valve that acts as both a thermal valve and an excess flow control valve. The end fitting has an elongated body formed in two telescoping sections, an inner section, and an outer section. An interior opening extends through both sections and includes an enlarged center portion. A floating valve member in the center portion is movable toward a valve seat at an outer end of the center section. A spring urges the valve member away from the valve seat but excessive gas flow moves the valve member toward the valve seat and restricts the valve. The two sections of the body are held in an extended axial position by a heat activated material, such as fusible solder, where the nipple opens the cylinder shutoff valve when the body is connected to the cylinder outlet. Excessive heat releases the heat activated material and causes the body sections to collapse to a retracted position, where the shutoff valve is permitted to close. At the same time, the stem of the inner section engages and closes the interior valve in the end fitting.

11 Claims, 5 Drawing Sheets

APPLIANCE END FITTING

BACKGROUND OF THE INVENTION

The present invention relates to an appliance end fitting for connecting a pressurized gas cylinder with a gas appliance such as a barbecue grill wherein the end fitting incorporates an improved and simplified construction that incorporates a dual function flow control and thermal shutoff valve.

Gas appliances such as barbecue grills are connected to pressurized propane or LP gas cylinders by means of an appliance end fitting on the end of an appliance supply hose or pressure regulator that is connected to an outlet valve on the gas cylinder. Standardized outlet valves are employed for gas cylinders, and appliance end fittings are designed to be compatible with these standardized outlets.

A gas cylinder assembly includes a gas cylinder and an outlet fitting. Cylinder outlet fittings usually incorporate a number of safety features, including a pressure relief valve, a manual shutoff valve operated by a hand wheel, and an automatic shutoff located inside an annular collar forming an outlet for the cylinder assembly. Such automatic shutoff valves usually include a valve member that is biased outwardly to a normally closed position against a valve seat, with the valve member being resiliently openable by inward pressure thereon to permit gas to flow from the cylinder.

An early standardized coupling or end fitting for connecting a gas appliance to a gas cylinder is called a POL coupling. In a POL coupling, an elongated tubular body having a rounded nose or nipple on an inner end fits inside the annular outlet collar of the cylinder assembly and is attached thereto by a left handed pipe thread connection between the outer surface of the body and the inner periphery of the collar, with the body being attachable by a wrench. The body is threaded into the outlet until the nipple opens the automatic shutoff valve, at which time the nipple sealingly engages a valve seat in the outlet and constrains gas flow from the outlet to a longitudinal opening through the elongated body. The outer end of the body typically is threaded externally so as to mate with a standardized nut or threaded opening on a hose or pressure regulator leading directly or indirectly to the gas appliance.

A newer style of standardized coupling is a so-called QCC-1 or Type 1 coupling. In such a coupling, the outlet collar of the cylinder assembly includes an external right hand acme thread, and the appliance end fitting that couples the cylinder to a pressure regulator or hose leading to the gas grill includes a large, hand-operable nut rotatably mounted on an elongated body of the type used in a POL coupling. Engagement of an internal acme thread on the nut with the external acme thread on the cylinder assembly outlet axially slides the body into the inlet, where the nipple on the end (still sometimes referred to as a POL type nipple) engages and opens the automatic shutoff valve in the cylinder assembly outlet. A Type 1 end fitting also generally includes another safety feature, a thermal shutoff valve that automatically shuts off the supply of gas from the gas cylinder in the presence of excessive heat that may be indicative of a flame traveling up the fuel line to the cylinder tank. There are a number of types of devices that do this. One type of device causes the ejection of the appliance end fitting from the cylinder itself in the presence of excess heat, thus actuating the cylinder outlet automatic shutoff valve. Other devices cause an internal shutoff valve in the coupling to actuate in the presence of excess heat. These valves generally operate by plastic parts that melt or soldered connections that melt in order to permit a biased valve member to close.

Appliance end fittings also sometimes include excess flow control valves, which automatically restrict or shut off the flow of gas from the tank when the rate of flow of gas is excessive. This can occur when a fuel line is cut, for example, in order to prevent excess fuel from escaping. Excess flow control valves and thermal shutoff valves typically are separate valves.

In a newer valve construction, an additional safety feature is incorporated into the cylinder assembly. This is a so-called overfill protection device (OPD). This is a valve that fits inside the LP tank and automatically shuts off a tank filling operation when the tank becomes filled to the desired level. Propane or LP fuel is provided in liquid form and requires a certain amount of open space in the cylinder, so that the fuel can be provided in vaporized form through the cylinder outlet. An example of an overfill prevention valve is shown in U.S. Pat. No. 5,842,500.

In all three of the most common standardized cylinder valve assemblies, a POL fitting, a Type 1 fitting, and an OPD fitting, a standardized coupling device or appliance end fitting is required. The device can be threaded on or it can employ a so-called quick connect fitting of various designs. An object of the present invention is to provide an improved appliance end fitting for a standardized connection wherein a single valve member operates as an excess flow control valve as well as a thermal shutoff valve in an economical construction.

SUMMARY OF THE INVENTION

The present invention comprises an improved appliance end fitting for connecting a gas operated appliance to a pressurized gas cylinder assembly, wherein the gas cylinder assembly includes an annular outlet having an automatic shutoff valve therein. The end fitting includes an elongated body having an inner end that fits into the cylinder outlet to open the shutoff valve and further includes a connector that releasably connects the elongated body to the outlet in a position wherein the shutoff valve is opened by the inner end.

The elongated body has a nipple at the inner end and has an outer end that is attachable directly or indirectly in fluid communication with a gas operated appliance. The body has an interior opening therethrough that extends from an inlet in the nipple to an outlet in the outer end. The body interior opening serves as a gas conduit through the appliance end fitting, the nipple fitting into the annular outlet and opening the shutoff valve when the connector is connected to the outlet. The nipple is shaped so as to sealingly engage a valve seat in the cylinder outlet when the nipple opens the shutoff valve, such that substantially all gas flow from the cylinder outlet is directed through the interior opening in the body. The elongated body is formed in two telescoping sections, an inner section that includes the nipple and an outer section that includes the outer end. The interior opening through the body has an enlarged center portion between in the inner and outer sections, with the center portion having a valve seat at an outer end thereof. A floating valve member, preferably a ball type valve, is positioned in the center portion and is movable toward engagement with the valve seat. The valve member is biased away from the valve seat, preferably by a resilient biasing mechanism or a spring positioned on an outer side of the valve member. The biasing mechanism urges the valve member away from engagement with the valve seat. In a vertically oriented system, the bias could be provided by gravity. Gas flow from the tank urges the valve member toward the valve seat. Excessive gas flow causes the valve member to deflect the spring to the point where the valve member severely restricts the valve, which in turn severely restricts gas flow from the tank.

The two sections of the body are locked together in an extended axial position with respect to each other by a fusible or otherwise heat activated material positioned between adjacent surfaces of the two sections. In the extended position, the nipple extends outwardly far enough from the outer section of the body that when the body is drawn into engagement with the cylinder outlet by connection of the connector to the outlet, the automatic shutoff valve is opened by the nipple. Excessive heat in the valve chamber causes the heat activated material to melt or otherwise release so as to permit relative axial movement of the inner and outer valve body sections. The inner section thereafter collapses with respect to the outer section at least to a retracted position, where the nipple fails to exert sufficient pressure on the shutoff valve to hold the automatic shutoff valve open, thus permitting the shutoff valve to close under excessive heat conditions.

In one aspect of the present invention, the outer end of the inner section of the body fits inside an inner end of the outer section and is positioned such that the collapse of the inner and outer sections of the body as a result of excessive heat conditions further causes the outer end of the inner section to engage the floating valve member and urge the valve member into a sealing engagement with the valve seat in the outer section. This results in the closing of the valve in the body as well as the automatic shutoff valve in the cylinder outlet in response to excessive temperature conditions.

The appliance end fitting of the present invention can be adapted to fit any of a number of standardized threaded or quick connect fittings, including a Type 1 fitting, a POL fitting, and a so-called OPD fitting.

Desirably, the telescoping sections of the body are fastened together with a fusible material such as solder, having a melting temperature of about 240° F. to about 300° F.

These and other features, objects, and benefits of the invention will be recognized by one having ordinary skill in the art and by those who practice the invention, from the specification, the claims, and the drawing figures.

DETAILED DESCRIPTION OF PREFERRED EMBODIMENTS

Figure 1:
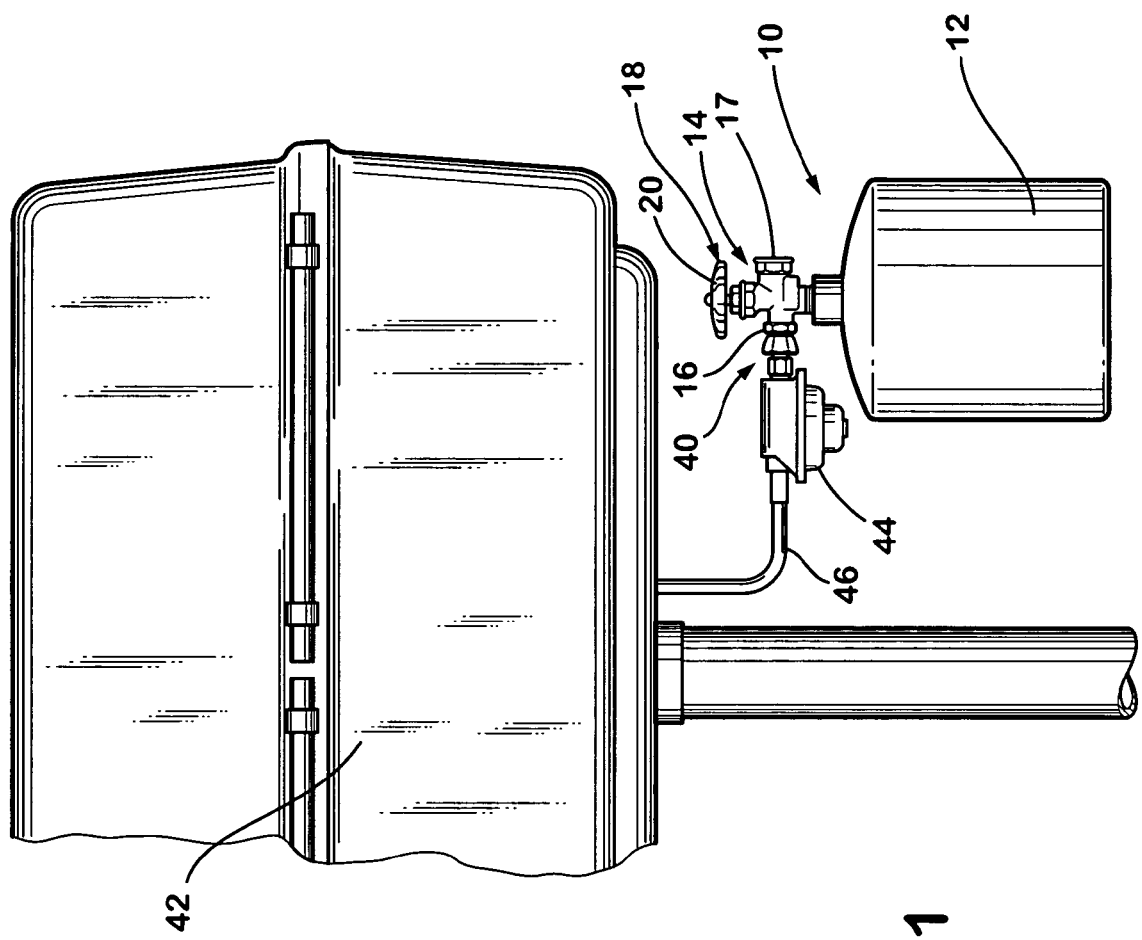
FIG. 1 is a partially schematic drawing showing the use of the appliance end fitting of the present invention in connecting a gas appliance such as a gas grill to the outlet of a gas cylinder assembly.
Figure 2:
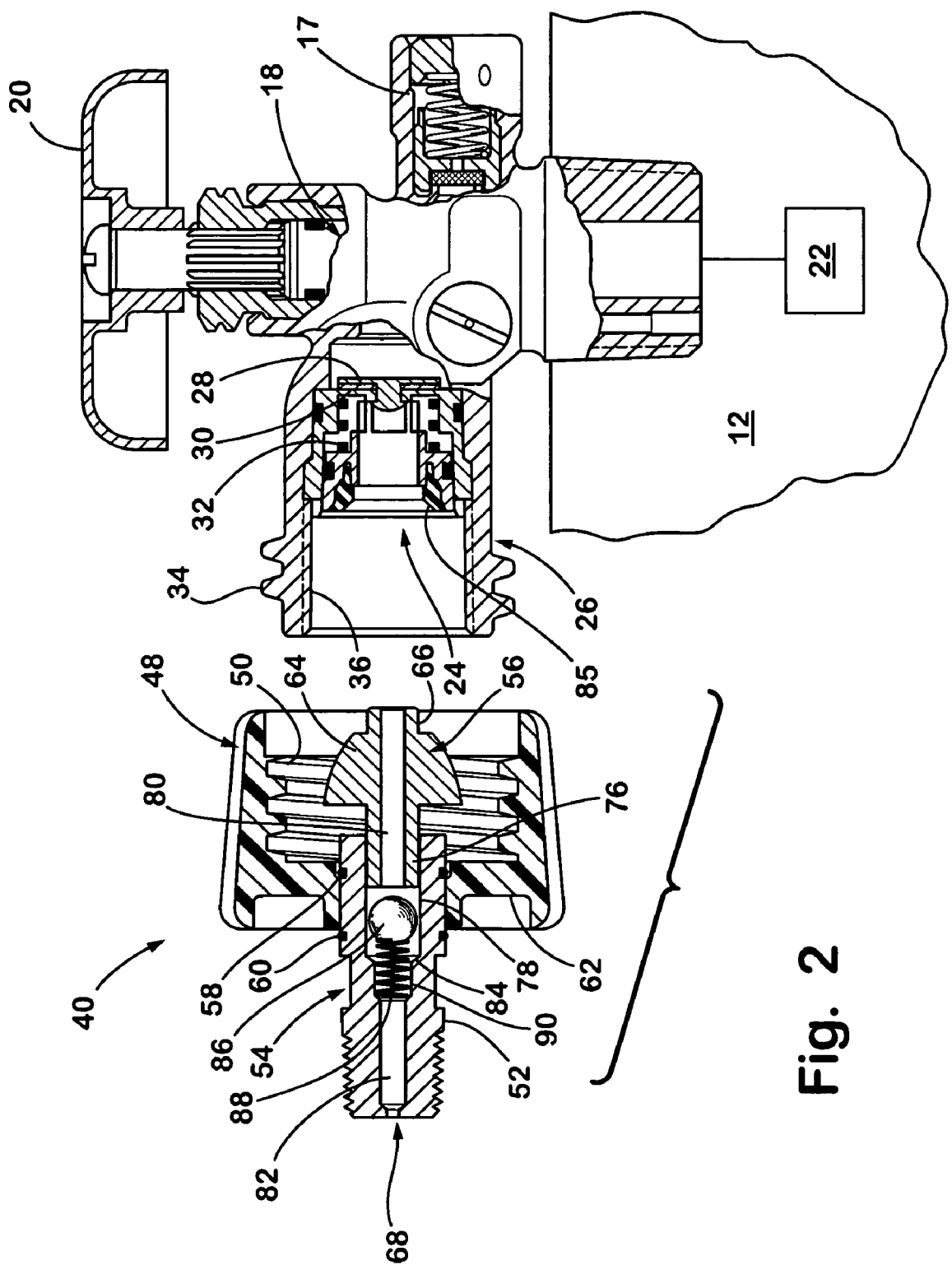
FIG. 2 is a partially sectional side elevational view showing the appliance end fitting of the present invention positioned to be connected to the outlet of a gas cylinder assembly.

Referring now to the drawings, a gas cylinder assembly 10 comprises a propane or LP gas cylinder 12 (typically having a capacity of 20 lbs) fitted with a cylinder outlet valve assembly 14. The outlet valve assembly is attached to an outlet in the tank and provides a gas passageway to a cylinder assembly outlet 16 of standardized configuration. A Type 1 connection is illustrated but other types of standardized connections, including threaded as well as quick connect couplings, can use the present invention. The outlet valve assembly includes a pressure relief valve 17 and manual shutoff valve 18 operated by hand wheel 20. The outlet valve assembly can also include an overfill protection device 22, shown schematically.

The cylinder outlet valve assembly also includes an automatic shutoff valve 24 mounted inside an annular collar 26 that defines the outlet of the gas cylinder assembly. The automatic shutoff valve is conventional and typically includes a movable valve member 28 that is biased outwardly toward a closed position against valve seat 30 by means of a spring 32. Valve member 28 is resiliently movable inwardly in order to open the automatic shutoff valve. This occurs automatically whenever an appliance end fitting is properly attached to the cylinder assembly outlet. This prevents the release of gas from the cylinder by opening the manual outlet valve unless the tank is properly connected to the gas appliance by an appliance end fitting. The outlet collar 26 is provided with an external right hand acme thread 34 in a Type 1 (QCC-1) connection. Outlet collar 26 also is usually internally threaded with a left hand pipe thread 36, so that the collar can accommodate an older style POL fitting wherein the fitting is threaded into the cylinder assembly outlet.

In accordance with the present invention, an improved appliance end fitting 40 is attachable to the cylinder assembly outlet in order to connect the cylinder to a suitable gas appliance 42, such as a propane or LP gas grill (shown schematically). The end fitting typically is first connected to a pressure regulator 44, and the pressure regulator is connected by a hose 46 to the appliance 42. A gas grill also has its own manually adjustable valve for controlling the rate of flow of gas to the grill burners.

Appliance end fitting 40 includes a nut or connector 48 having internal acme threads 50 that mate with the external threads 34 on the cylinder assembly outlet. The nut is rotatably mounted on an outer section 52 of an elongated body 54. The body also includes an inner section 56, with inner and outer sections being telescopically mounted together for axial movement with respect to each other. Nut 48 is mounted on the outer section 52 of the elongated body by means of spaced retaining rings 58 and 60 that are positioned in grooves adjacent opposite sides of an annular flange 62 on the rear side of the nut. The retaining rings constrain the nut to rotational movement at a fixed axial position on the outer section of the elongated body. As the nut is threaded on the cylinder assembly outlet, the elongated body is moved inwardly in an axial direction into the interior of the cylinder assembly outlet. A nose or nipple 64 on the inner end of the inner section of the elongated body has a domed or contoured outer surface, with a tubular projection 66 extending inwardly from an inner end. The nose is shaped to be compatible with the style of standardized fitting with which it is used. If the present invention is employed with an older style POL fitting, external threads on a rear section of the fitting are employed instead of the nut 48.

As used in the present invention, the expression "inner" usually refers to a direction in the end fitting facing the cylinder outlet, while the term "outer" refers to a direction facing away from the cylinder outlet and toward the gas appliance.

The elongated body has an axial opening 68 that extends through the body from an inlet 80 in the nose to an outlet 82 in the outer end of the outer section.

Nose 64 is shaped so that it engages a valve seat 85 in the cylinder assembly outlet in a sealing relationship when the appliance end fitting is properly connected to the cylinder assembly outlet. This type of connection is generally called a POL connection. As the nose is properly sealed against the valve seat, the automatic shutoff valve is automatically opened in a conventional manner, permitting gas to be transmitted from the gas cylinder. However, gas flow is restricted to the interior opening 68 that extends through the elongated body 54, which in turn leads to the gas appliance.

Figure 3:
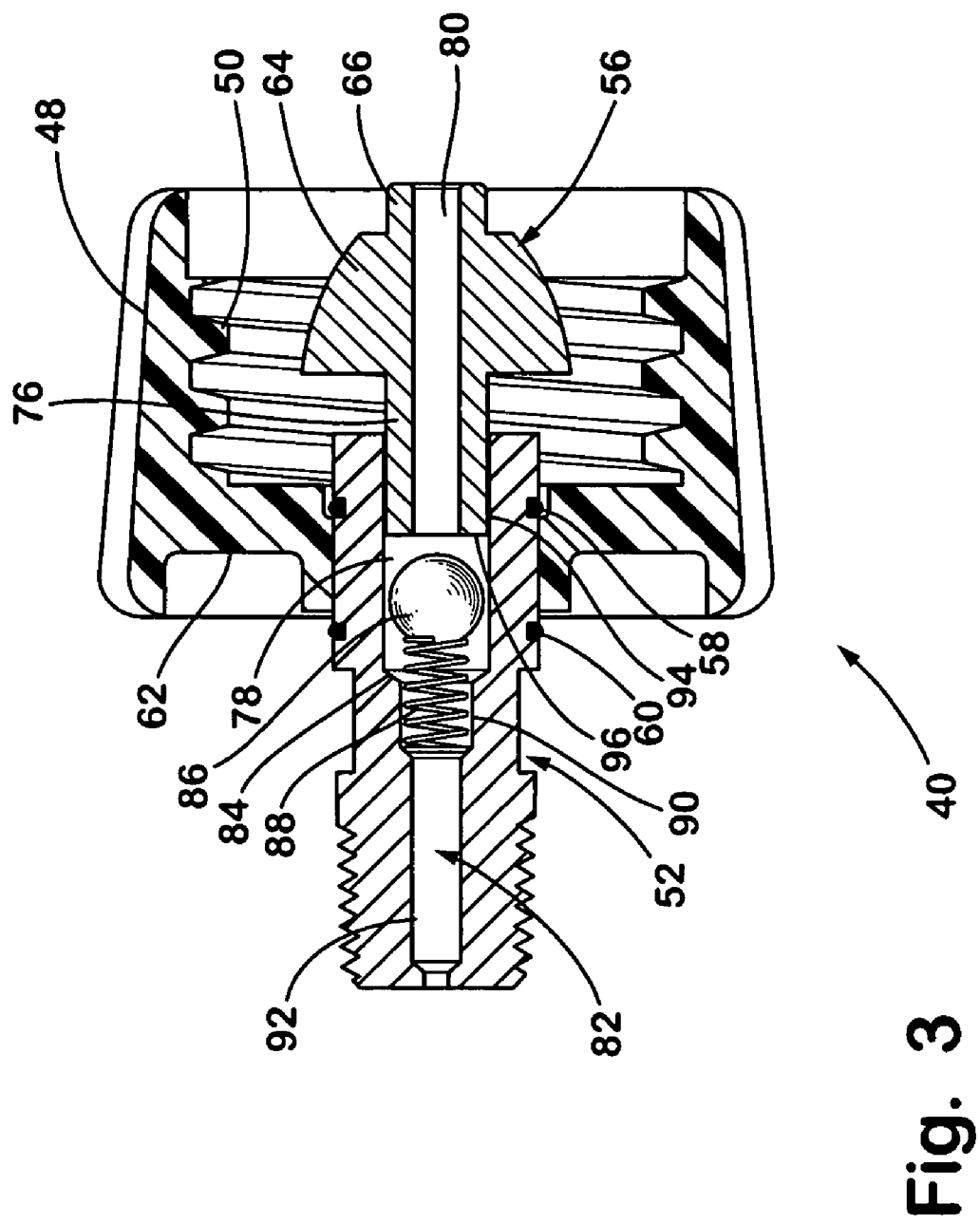
FIG. 3 is a sectional side elevational view of one embodiment of the appliance end fitting of the present invention.

Referring to FIG. 3, inner and outer sections 56 and 52 of the elongated body fit telescopically together, with a stem 76 on the inner section fitting into an enlarged opening 78 in the outer section. Enlarged opening 78 serves as an enlarged center portion of the opening through elongated body, with narrower inner and outer portions 80 and 82 being positioned on inner and outer sides, respectively, of the center portion 78.

A valve seat 84 is formed at an outer end of center portion 78. The valve seat is designed to mate with a valve member 86 that floats in center portion 78. Valve member 86 may be in the form of a ball. A resilient biasing device or spring 88 fits in a somewhat enlarged portion 90 of the outer portion 82 of the opening through the elongated body. The biasing force could be provided by other means, such as by gravity in a vertically oriented valve. Enlarged opening 90 is smaller than opening 78 but is somewhat larger than the more narrow portion 92 on the outer side of portion 90. As shown, spring 88, which preferably is a compression spring, engages the outer side of the valve member and urges the valve member away from a seated position against valve seat 84, thus permitting gas flow through the interior opening in the body. When the appliance fitting is connected to a gas cylinder and gas is flowing through the interior opening of the body, the flowing gas exerts pressure against the valve member urging the valve member toward a closed position. Under normal operating conditions, spring 88 will maintain the flow control valve in an open condition, but in unusual situations, such as when the hose is cut or disconnected, the pressure from the increased rate of gas flow will close the flow control outlet valve, thus preventing an inadvertent release of gas when the appliance is not properly connected. Desirably, the fit between the valve and valve seat is not completely gas tight, so there continues to be a minor amount of gas flow through the valve even when it is closed. The minor flow of gas is generally desirable because this ensures that the valve will open automatically and quickly when the excess flow condition abates.

The inner and outer sections of the elongated body are fused together, with the nose in an extended position (as shown) by means of a fusible material (such as solder) 94 that interconnects the adjoining surfaces of the inner and outer sections of the elongated body. The fusible material is set to melt between about 240° F. and about 300° F. This provides thermal protection against excessive heat as follows.

In normal operation, nose 64 extends inwardly a sufficient distance that the automatic shutoff valve 24 is opened when the coupling nut is fully threaded on the cylinder assembly outlet. When, however, there is an excessive heat condition, such as might occur if flame travels up the hose from the gas appliance to the gas cylinder, the excessive heat melts the fusible material. When the fusible material melts, the nose then can collapse into the outer section of the elongated body to a retracted position. Gas pressure in the tank and the spring bias of the automatic shutoff valve urge the nose to collapse into the outer section, out of engagement with the shutoff valve, permitting the shutoff valve to close. At the same time, an outer end 96 of stem 76 engages valve member 86 and causes it to compress spring 88 until the valve member engages valve seat 84, closing the appliance end fitting internal valve as well as permitting the automatic shutoff valve in the gas cylinder outlet to close. Thus, an excessive heat condition automatically closes both valves, providing an improved safety measure.

The foregoing construction provides a cost effective and simplified valve assembly wherein both thermal and excessive flow protection is provided by a single valve and wherein two shutoff valves are actuated in the presence of an excessive heat condition.

Figure 4:
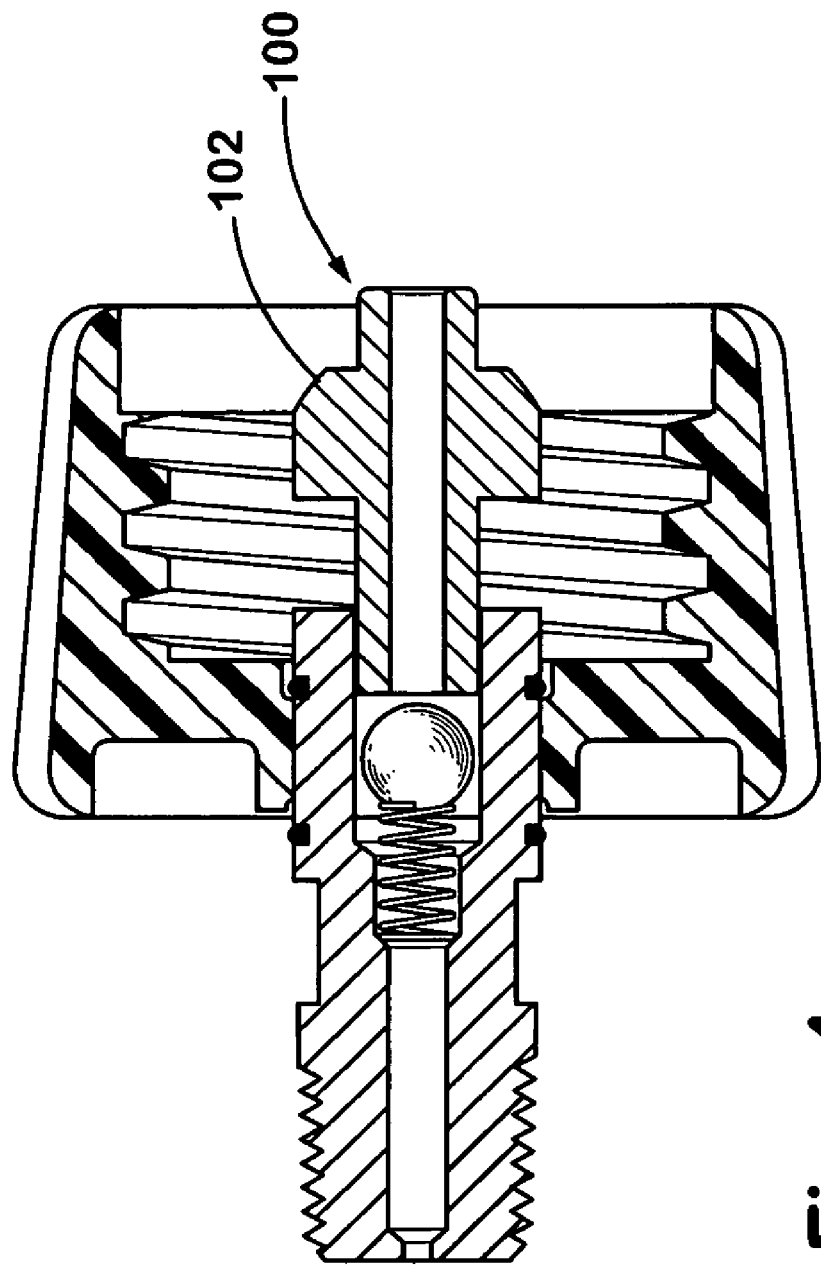
FIG. 4 is a sectional side elevational view showing a second embodiment of the appliance end fitting of the present invention.

A similar construction of the present invention is shown in the embodiment 100 of FIG. 4, with the exception that the nose 102 on the inner section has a slightly different shape. This is a more economical design that still mates with a standard cylinder outlet valve seat. Otherwise, the appliance end fitting is substantially the same as in FIG. 3.

Figure 5:
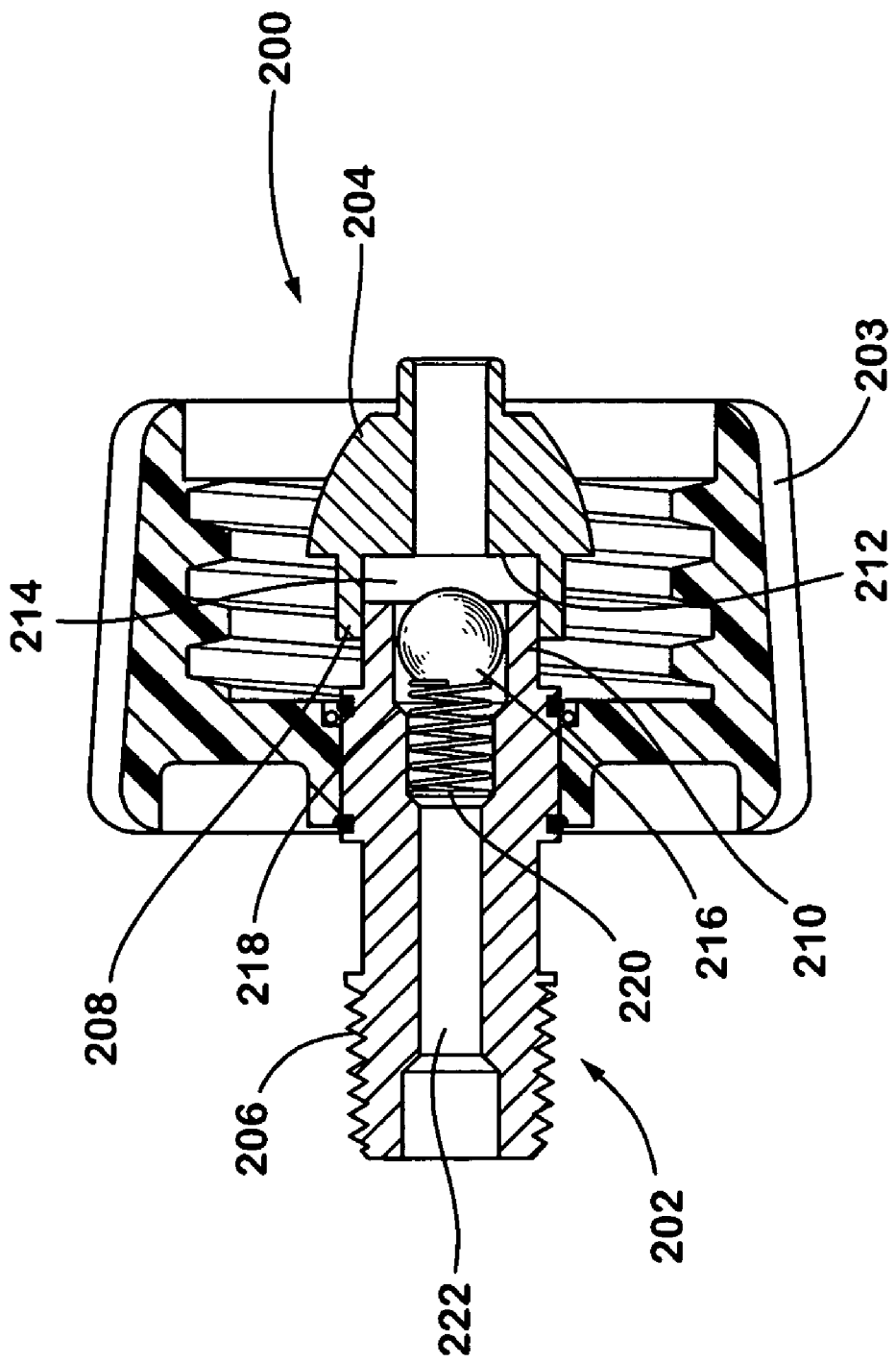
FIG. 5 is a sectional side elevational view showing a third embodiment of the appliance end fitting of the present invention.

A third embodiment of the present invention is shown in FIG. 5. In this embodiment, as before, end fitting 200 includes a body 202 mounted in a rotatable nut or connector 203. Body 202 is formed of inner and outer telescoping sections 204 and 206, as described previously, except that in this embodiment the inner section fits over instead of inside the outer section. A collar 208 on the outer end of inner section 204 fits over a stem 210 on the inner end of outer section 206. Surface 212 at the end of enlarged opening 214 in inner section 204 engages ball valve 216 and urges it into engagement with valve seat 218 against the resistance of spring 220, thus restricting the flow of gas through internal opening 222 when there is an excessive flow condition.

It should be understood that various modifications in the arrangements and details of construction of the embodiments disclosed herein may be made without departing from the spirit and scope of the present invention, which is defined in the appended claims.

I claim:

1. An appliance end fitting for connecting a gas operated appliance to a pressurized gas cylinder assembly, wherein the gas cylinder assembly includes an annular outlet having an automatic shutoff valve therein, the shutoff valve including a valve member that is biased to a normally closed position but is resiliently openable by inward pressure thereon to permit the release of gas from the cylinder assembly, the end fitting including an elongated body having a nipple at an inner end that fits into the cylinder outlet to open the shutoff valve and having an outer end that is attachable directly or indirectly in fluid communication with a gas operated appliance, the end fitting further including a connector that releasably connects the elongated body to the outlet in a position wherein the shutoff valve is opened by the inner end, the elongated body further having an interior opening therethrough that extends from an inlet in the nipple to an outlet in the outer end, the body interior opening serving as a gas conduit through the appliance end fitting, the elongated body being formed in two telescoping sections, an inner section that includes the nipple and an outer section that includes the outer end, the interior opening having an enlarged center portion between the inner and outer sections, the center portion having a valve seat at an outer end thereof, a floating valve member being positioned in the center portion and being movable into engagement with the valve seat, the valve member being normally biased away from engagement with the valve seat, gas flow from the tank urging the valve member toward the valve seat, excessive gas flow causing the valve member to overcome the bias to the point where the valve member engages the valve seat and restricts gas flow from the tank, thus serving as an excess flow control valve, the two sections of the body being fixed together in an extended axial position with respect to each other by a heat activated material positioned between the two sections, the nipple extending inwardly far enough from the outer section of the body that when the body is drawn into engagement with the cylinder outlet by connection of the connector to the outlet, the automatic shutoff valve is opened by the nipple, excessive heat in the valve chamber causing the heat activated material to release so as to permit relative axial movement of the inner and outer valve body sections, the inner section thereafter collapsing with respect to the outer section at least to the point where the nipple fails to exert sufficient pressure on the shutoff valve to hold the automatic shutoff valve open, thus permitting the shutoff valve to close under excessive heat conditions.

2. An appliance end fitting as in claim 1, wherein an outer end of the inner section fits inside an inner end of the outer section and is positioned such that the collapse of the inner and outer sections of the body as a result of excessive heat conditions further causes the outer end of the inner section to engage the floating valve member and urge the valve member into a sealing engagement with the valve seat in the outer section, thus resulting in the closing of the valve in the body as well as the automatic shutoff valve in the cylinder outlet in response to excessive temperature conditions.

3. An appliance end fitting as in claim 1 wherein the connector is an internally threaded nut rotatably mounted at a predetermined axial position on the outer section of the elongated body, the nut being formed to threadably engage an external thread on the annular outlet of the gas cylinder assembly.

4. An appliance end fitting as in claim 3 wherein the end fitting is compatible with a standard Type-1 gas cylinder assembly connection.

5. An appliance end fitting as in claim 3 wherein the end fitting is compatible with a standard POL gas cylinder assembly connector.

6. An appliance end fitting as in claim 3 wherein the end fitting is compatible with a standard gas cylinder connection that includes an overfill protection device.

7. An appliance end fitting as in claim 1 wherein the floating valve member is a ball and the valve seat is shaped to fit against the ball in a flow restricting relationship therewith.

8. An appliance end fitting as in claim 7 wherein the end fitting permits a minor amount of gas to flow through the end fitting even under excess flow conditions, such that the flow control valve opens quickly and easily when an excess flow condition abates.

9. An appliance end fitting as in claim 1 wherein the inner and outer sections are fused together with a solder connection that melts at about 240° F. to about 300° F.

10. An appliance end fitting as in claim 1 wherein the spring in the body is a compression coil spring and fits in an enlarged spring receptacle adjacent an outer side of the valve seat, the spring receptacle having an outer end that engages an outer end of the spring and restrains outward movement thereof, causing the spring to be compressed in response to engagement of an inner end thereof with an outwardly urged valve member.

11. An appliance end fitting as in claim 1 wherein the outer end of the inner section comprises an annular collar that telescopically fits over a stem on an inner end of the outer section, an internal surface at an inner end of an enlarged opening in the inner section engaging the floating valve member and moving it into engagement with the valve seat under excess flow conditions.

* * * * *